United States Patent [19]

Hung et al.

[11] Patent Number: 5,100,946
[45] Date of Patent: Mar. 31, 1992

[54] STABILIZED HALOGEN CONTAINING POLYMER COMPOSITIONS

[75] Inventors: Paul L. K. Hung, Edison; William L. Smith, Basking Ridge, both of N.J.; Daniel B. Dess, Richwood, Tex.; Sriram Seshadri, Newtown, Pa.

[73] Assignee: Atochem North America, Inc., Philadelphia, Pa.

[21] Appl. No.: 634,446

[22] Filed: Dec. 27, 1990

[51] Int. Cl.⁵ .............................................. C08K 5/09
[52] U.S. Cl. ................................... 524/397; 524/178; 524/180; 524/182; 524/417; 524/423; 524/424; 524/430; 524/443
[58] Field of Search ............... 524/397, 182, 180, 178, 524/424, 423, 430, 417, 443

[56] References Cited

U.S. PATENT DOCUMENTS

| | | | |
|---|---|---|---|
| 2,564,646 | 8/1951 | Leistner et al. | 524/147 |
| 2,777,826 | 1/1957 | Olson | 524/382 |
| 2,782,176 | 2/1957 | Darby et al. | 524/710 |
| 2,894,979 | 7/1959 | Leach | 560/2 |
| 2,934,507 | 4/1960 | Chadwick et al. | 524/114 |
| 3,054,771 | 9/1962 | Hiestand et al. | 524/178 |
| 3,236,793 | 2/1966 | Robins et al. | 524/178 |
| 3,396,185 | 8/1968 | Hechenbleikner et al. | 524/178 |
| 3,442,852 | 5/1969 | Dorfelt et al. | 524/182 |
| 3,499,860 | 3/1970 | Penneck | 524/397 |
| 3,567,581 | 3/1971 | Weisfeld et al. | 376/422 |
| 3,642,677 | 2/1972 | Brecker et al. | 524/181 |
| 3,644,246 | 2/1972 | Lozanou | 524/178 |
| 3,824,210 | 7/1974 | King | 524/178 |
| 4,081,493 | 3/1978 | Kazama et al. | 524/397 |
| 4,681,907 | 7/1987 | Mesch et al. | 524/182 |

Primary Examiner—Paul R. Michl
Assistant Examiner—Tae H. Yoon

[57] ABSTRACT

The present invention comprises a stabilized halogen containing polymer, preferably poly(vinyl halide), and more preferably poly(vinyl chloride) composition. A preferred polymer composition is a rigid halogenated polymer such as rigid poly(vinyl chloride). The composition contains at least one metal salt selected from the group consisting of at least one carboxylic acid or derivative thereof having at least two carboxyl groups, at least one carboxyl group and at least one hydroxyl group, at least one carboxyl group and at least one mercaptan, and an aromatic carboxylic acid having at least one carboxyl group. The metal salt is most preferably disodium adipate.

28 Claims, No Drawings

STABILIZED HALOGEN CONTAINING POLYMER COMPOSITIONS

BACKGROUND OF THE INVENTION

1. Field of the Invention

This invention relates to a stabilized halogen-containing polymer composition, preferably a poly(vinyl halide) composition; more particularly, this invention relates to a poly(vinyl chloride) (PVC) composition comprising a stabilizer and at least one metal salt of a carboxylic acid having at least two carboxyl groups, or an aromatic carboxylic acid having at least one carboxyl group, particularly disodium adipate (DSA).

2. Description of Related Art

Many halogen containing polymers and copolymers are thermoplastic in nature, and, therefore, require heating in order to soften them during fabrication operations such as molding, calendering, and extruding. The heat with which these polymers are processed is usually in the range of 160° C. to 250° C., and more typically 180° C. to 225° C. and is limited in degree and duration by their tendency to deteriorate and decompose. Decomposition of the polymers leads to deterioration of the resultant physical properties of the resin. In addition, a severe darkening in color of the resin results which prohibits its use in lightly colored or transparent articles. This deterioration and decomposition is a major drawback to the use of poly(vinyl chloride) resins in many applications, and in order to overcome this drawback several products have been proposed as stabilizers for halogen containing vinyl polymers. In general, the stabilizers fall into three main classes, metal soaps, organic chemicals, and organometallic compounds.

Vinyl halide polymer compositions typically contain one or more metal-containing heat stabilizers. Metal-containing stabilizers include compounds where the metal is lithium, sodium, potassium, magnesium, calcium, zinc, strontium, cadmium, barium, manganese, iron, cobalt, titanium, aluminum, tin, lead, bismuth or antimony, or a mixture of any two or more such metal-containing compounds. The use of many of these metal-containing compounds as PVC stabilizers is described in British Patent Specification 1,001,344 and an article by Robert G. Weiler, "Uncommon Metals as Heat Stabilizers for Flexible Vinyl", pages 534-537, Volume 28, Technical Papers, Society of Plastics Engineers, Inc., 1982.

Organotin compounds, particularly those having tin bonded to sulfur, such as those which contain a mercapto group, have been found to be an extremely effective type of stabilizer for halogen containing polymers, such as poly(vinyl chloride) polymers. A continuing goal is to develop compositions with equal or better heat stability properties than comparable compositions using organotin stabilizers which are relatively expensive. It is desirable to replace at least a portion of the tin present in a given resin formulation with a less expensive material. It is also desirable to enhance the stabilizing properties of less efficient organotin compounds by addition of inexpensive synergistic additive compounds. Improved stabilized compositions could result in obtaining longer processing times at elevated temperatures and to be able to process resin formulations at higher temperatures.

It has been characteristic of stabilizing systems that they may not fully prevent the deterioration of resins or polymers, including poly(vinyl chloride), during the period when the resins and stabilizer compositions are heated during processing. During this period, which may be from 5 to 30 minutes or longer, the various ingredients including e.g., pigment, plasticizer, stabilizer, lubricant, etc., may be mixed with the resin and the mixture subjected to the influence of heat and pressure to form a substantially homogeneous mixture. Under these processing conditions (T=180° C. or greater), the resin deteriorates, thereby shortening the period that the resin mixture can be heated.

In injection molding processes, heated resin compositions are injected into molds. In general, the viscosity of the resin composition drops as temperature increases. Cycle times of injection molding processes could be reduced by increasing the temperature of the resin composition. It would be useful to be able to raise the processing temperatures of injection molding and other processes.

Well-known metal-containing heat stabilizers for vinyl halide polymers include compounds of the elements of Groups IIA and IIB of the Periodic Table of the Elements, as well as compounds of tin, lead, bismuth and antimony. Conventional well-known heat stabilizers for vinyl chloride polymers are also discussed in Chapter 9 of *The Encyclopedia of PVC*, edited by L. I. Nass (M. Dekker, New York 1976).

SUMMARY OF THE INVENTION

The present invention relates to a stabilized halogen containing polymer, preferably poly(vinyl halide), and more preferably poly(vinyl chloride) composition. The composition comprises a polymeric material having greater than 60 volume percent of the halogen containing polymer. The polymeric material can be a rigid polymeric material, or a flexible polymeric material plasticized with a non-chlorinated plasticizer. By rigid, it is meant that the polymer contains substantially no plasticizer. By flexible, it is meant that the polymer contains plasticizer. The composition comprises the halogen containing polymer, preferably poly(vinyl halide), and more preferably a poly(vinyl chloride) homopolymer.

The composition comprises a metallic based stabilizer, preferably a stabilizer selected from the group consisting of organometallic, metallo-organic, lead carbonate, lead sulfate, lead oxide, lead phosphite, lead silicate, wherein the metal cation of the organometallic, metallo-organic compounds is based on metals selected from the group consisting of metals from Groups Ia, Ib, IIIa, IVa, IVb, Va, VIIb, and VIII, of the Periodic Table of Elements.

There is from 0.01 to 10, preferably 0.01 to 5, more preferably 0.1 to 2.0 percent based on the halogen containing polymer of at least one Group Ia metal carboxylate salt of at least one carboxylic acid or derivative thereof selected from carboxylic acids having at least two carboxyl groups, at least one carboxyl group and at least one hydroxyl group, at least one carboxyl group and at least one mercaptan, and aromatic carboxylic acids or derivatives thereof having at least one carboxyl group, wherein the metal cation of the metal carboxylate salt is based on metals selected from the group consisting of metals from Groups Ia, Ib, IIIa, IVb, Va, VIIb, and VIII, of the Periodic Table of Elements. Group Ia metal carboxylate salts are preferred with disodium adipate most preferred. For the purpose of the present invention, the carboxylate salt is an additional and different material than the stabilizer. The composition requires both the stabilizer and the metal carboxylate salt as recited above.

The metal salt useful in the present invention is preferably selected from the group consisting of monosodium and disodium salts of adipic acid and maleic acid and esters thereof. Preferred sodium salts are selected from the group consisting of disodium adipate and monosodium salts of mono esters of adipic acid and maleic acid. The esters are preferably alkyl esters of an acid and an alcohol wherein the alcohol has from 1 to 22 carbon atoms and preferably from 3 to 18 carbon atoms. Particularly preferred salts are disodium adipate, sodium hexyl maleate, sodium octyl maleate, sodium decyl maleate and sodium dodecyl maleate, with disodium adipate most preferred.

The amount of the metal salt is preferably sufficient to attain a Stability Time, as defined below, of at least one minute longer compared to a composition with an equal amount of stabilizer without the sodium salt. Preferably, useful compositions have a Stability Time of at least 6, and more preferably at least 8 minutes. Alternatively, the present invention can be viewed as a composition which can achieve equivalent stability with the use of less tin based stabilizer by the use of the above recited sodium salt. It has been found that the amount of metal, preferably tin based stabilizer, can be reduced up to 50 percent based on elemental tin, with equivalent or better stabilization and color retention.

Tin based stabilizers are preferred in the composition of the present invention and can include organotin stabilizers with preferred stabilizers being mercaptide and mercapto-ester based stabilizers. Particularly preferred tin based stabilizers include at least one stabilizer selected from the group consisting of dialkyltin dimercaptide, mercapto-esters, mercapto alkanols, alkyltin carboxylates, and dialkyltin salts of fatty acids and sulfur bridged tin compounds. Most preferred are mixtures of mono and dialkyltin mercaptides and/or mercaptoesters and sulfur bridged tin compounds.

Typically, compositions contain from 0.01 to 5.0, preferably 0.01 to 3.0, more preferably 0.1 to 2.0, and most preferably 0.5 to 1.5 percent by weight (or parts per hundred of resin, i.e., phr) of a tin based stabilizer based on the weight of the polymer. Considering the elemental tin in the stabilizer to be the operative material in the tin based stabilizer, such stabilizers can alternatively be based on the weight of the elemental tin in the tin stabilizer. As such, typical compositions contain from 0.005 to 1.0 and preferably 0.005 to 0.5 parts per hundred of tin, based on the halogen containing polymer. More preferably the amount of tin is in the range of from 0.05 to 0.5 parts per hundred of the resin.

While the use of tin based stabilizers is well-known, they are expensive compared to simple metal stabilizers. In accordance with the present invention, the addition of the sodium salt to the composition of the present invention can reduce the amount of tin required while maintaining or improving stabilized properties.

Preferred halogen containing polymers which exhibit superior melt stabilization are poly(vinyl chloride) and chlorinated poly(vinyl chloride) with rigid poly(vinyl chloride) homopolymers being most preferred. The halogen containing polymers can include copolymers with vinyl acetate, vinylidene chloride, styrene, dialkyl fumarate or maleate, or other alkyl esters of mono-olefinic acids, as well as blends and alloys with other thermoplastic resins. The halogen containing polymer preferably includes polyvinyl halogen polymer and more preferably the poly(vinyl chloride), although others such as the bromide or fluoride may be used. Also included are halogenated polyolefins.

DESCRIPTION OF THE PREFERRED EMBODIMENTS

The present invention relates to a composition comprising a halogen containing polymer, a metal based stabilizer, and a carboxylate salt preferably the sodium salt of adipic or maleic acid, and most preferably disodium adipate.

In general, halogen containing polymers are vinyl halide polymer compositions including homopolymers of vinyl halide monomers, copolymers of vinyl halide monomers with other monomers and including both block and graft copolymers, and alloys, blends and mixtures of vinyl halide polymers with other polymers.

Preferred halogen-containing polymers include poly(vinyl halides), preferably poly(vinyl chloride), and copolymers thereof with vinyl acetate, vinylidene chloride, styrene, dialkyl fumarate or maleate, or other alkyl esters of mono-olefinic acids, as well as blends and alloys of vinyl halide polymers with other thermoplastic resins. The poly(vinyl halide) polymer used is ordinarily and preferably the chloride, although others such as the bromide or fluoride may be used. The preferred polymer is a rigid homopolymer of poly(vinyl chloride).

Useful polymers in the composition of the present invention include: copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate, methyl acrylate, 2-ethylhexyl acrylate, butyl acrylate, ethyl acrylate and other alkyl acrylates, methyl methacrylate, ethyl methacrylate, butyl methacrylates, hydroxy-ethyl methacrylate and other alkyl methacrylates, methyl alpha chloroacrylate, styrene, vinyl ethers such as vinyl ethyl ether, vinyl chloroethyl ether, vinyl phenyl ether, vinyl ketones such as vinyl methyl ketone, vinyl phenyl ketone, trichloroethylene, 1-fluoro-1-chloro-ethylene, acrylonitrile, chloro-acrylonitrile, allylidene diacetate, chloroallylidene diacetate, and ethylene and propylene.

Polymer blends include blends of: poly(vinyl chloride) and poly(ethylene), poly(vinyl chloride) and poly(methyl methacrylate), poly(vinyl chloride) and poly(butyl methacrylate), poly(vinyl chloride) and polystyrene; poly(vinyl chloride) and acrylonitrile-butadiene-styrene copolymer, and poly(vinyl chloride) and poly(methyl methacrylate).

Polymer blends useful in the practice of this invention comprise physical blends of at least two distinct polymeric species. The composition comprises a matrix or continuous phase of the halogen containing polymer. Preferably the polymeric material in the composition comprises from 60, more preferably from 75, and yet more preferably from 90 volume percent of the halogen containing polymer. Of course the composition of the present invention includes embodiments where the polymeric material is 100 percent of the halogen containing polymer.

The benefits of this invention preferably apply to both rigid and flexible halogen-containing polymers. For the purpose of the present invention "rigid" polymers are considered to be polymer compositions which contain substantially no plasticizer. Reference is made to Billmeyer, Textbook of Polymer Science, 2d Ed., p. 420, for the accepted definition of the term "rigid". The vinyl halide polymers can be compounded for extrusion, injection molding, blow molding and calendaring, and can be formed into such finished articles as fibers, wire and cable, siding, window profiles, pipe, elbows and other pipe fittings, film, sheets and bottles. The vinyl halide polymers can be mixed with other ingredients such as dyes, pigments, flameproofing agents, internal and external lubricants, impact modifiers, and processing aids, and with other additives to prevent, reduce or mask discoloration or deterioration caused by heating, aging, exposure to light or weathering.

The composition can also be used with flexible halogen containing polymers. For the purpose of the present invention "flexible" is considered plasticized consistent with Billmeyer, Jr., supra at page 421. The compositions of the present invention include one or more non-chlorinated plasticizers including those referred to in Billmeyer at page 421, and in Modern Plastic Encyclopedia, 1979, McGraw Hill at pages 106, 212 and 685–695, which are useful with halogenated polymers. Useful plasticizers include, but are not limited to, phthalate esters, as well as adipates, azelates, phosphates, and epoxidized oil. A commonly used plasticizer is di(2-ethylhexyl) phthalate (DOP). Other useful plasticizers include tricresyl phosphate, dibutyl phthalate, dibutyl sebacate, tributyl phosphate, epoxidized esters, dioctyl phthalate, trioctyl phosphate, dioctyl sebacate and adipate, and various low-molecular weight polymers such as poly(propylene glycol) esters are now widely utilized as plasticizers for the vinyls. The plasticizer content varies widely with the end use of the material, but typically is from 10 to 60 percent by weight and preferably about 40.

The compositions can contain one or more metal-containing heat stabilizers. Metal-containing stabilizers including compounds where the metal is lithium, sodium, potassium, magnesium, calcium, zinc, strontium, cadmium, barium, manganese, iron, cobalt, titanium, aluminum, tin, lead, bismuth or antimony, or a mixture of any two or more such metal-containing compounds. The use of many of these metal-containing compounds as PVC stabilizers is described in British Patent Specification 1,001,344 and an article by Robert G. Weiler, "Uncommon Metals as Heat Stabilizers for Flexible Vinyl", pages 534–537, Volume 28, *Technical Papers,* Society of Plastics Engineers, Inc., 1982.

The present invention includes stabilizers selected from the group consisting of organometallic, metallo-organic compounds wherein the metal in the organic compounds is selected from the periodic groups Ia, Ib, IIIa, IVa, IVb, VA, VIIb, and VIII, lead compounds and cerium compounds. The most preferred stabilizers are tin based stabilizers with organotin compounds especially preferred. For the purposes of the present invention organometallic compounds are compounds wherein there is at least one metal atom bonded to a carbon atom. By metallo-organic compounds it is meant that the compound contains at least one metal compound indirectly bonded to a carbon through a connecting atom such as sulfur, oxygen or other connecting atoms.

Useful metallo-organics, soaps and inorganic salts other than tin include, but are not limited to, antimony tris(isooctyl mercaptoate), lead stearate, dibasic lead phthalate, lead carbonate, lead sulfate, lead oxide, lead phosphite, and lead silicate. Useful titanium stabilizers are presented in U.S. Pat. No. 2,777,826.

The metal component of said metallo-organic compound can include lithium, sodium, potassium, manganese, cobalt, titanium, aluminium, tin, lead, antimony and mixtures thereof. Useful metallo-organic compounds include mono carboxylate salts and phenolates, mercaptides and mercaptoesters of antimony, strontium, titanium, lead, bismuth and mixtures thereof. A particularly useful stabilizer is trimercaptide of antimony.

The organotin compounds represent an especially well-known and widely used class of metal-containing heat stabilizers for vinyl halide polymers. Included within the class of useful organotin compounds are those containing one or more tetravalent tin atoms each of which have at least one direct tin-to-carbon bond. Such compounds are described in U. S. patents and other references. The stabilizer used is preferably substantially non-volatile at ordinary temperatures, namely, 180° C., and dispersible in the selected vinyl resin, that is, compatible to the extent that it may be compounded with the resin in compounding operations that are used in this industry.

A useful class of tin-containing heat stabilizers are compounds containing one or more tetravalent tin atoms which each have at least one direct tin-to-sulfur or tin-to-oxygen bond, that is, which contain a group:

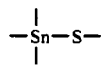

or

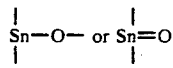

Examples of such compounds with tin-to-sulfur bonds are described in U.S. Pat. No. 3,764,571, issued to Jennings, and examples of compounds with tin-to-oxygen bonds are described in U.S. Pat. No. 3,167,527, to Hechenbleikner et al.

Organotin compounds include those containing one or more tetravalent tin atoms having at least one direct tin to carbon bond and wherein the remaining valences of the tin atom are satisfied by bonds to either oxygen, sulfur as a residue resulting from removal of the hydrogen atom from the sulfur atom of a mercaptan, mercaptoacid, mercaptoalcohol, mercaptoacid ester or mercapto-alcohol ester or a residue resulting from removal of the hydrogen atom from the oxygen atom of a carboxylic acid or alcohol or halogen acid with the provision that at least one valence site is oxygen or sulfur or mixture thereof. Organotin compounds include methyltin mercaptide, butyltin mercaptide, octyltin mercaptide, ester tin mercaptide, and the reaction product of an organotin halide with alkaline metal sulfide and mercaptide, mercaptoacid esters, mercaptoalcohols, or mercaptoalcohol esters or mixtures thereof. Other tin compounds include organotin mercaptides, halogen containing sulfur or oxygen bridged organotin mercaptides, alkyltin carboxylates, and organotin alkoxides. The organotin compounds include an organotin chloride- /organotin mercaptide combination or an alkyl chlorotin carboxylate.

Tin compounds can be used alone or in combination, in the form of mixtures that react in situ, as described in U.S. Pat. No. 3,674,737 to Brecker, in the form of mixtures as described in U.S. Pat. No. 4,255,320 to Brecker and as blends as described in U.S. Pat. No. 4,576,984 to Bresser et al.

In addition, the tin compounds, mixtures, blends and the like referred to above can be used in combination with an organotin halide as disclosed by Larkin in U.S. Pat. No. 3,715,333.

The tin based stabilizers useful herein are well known for their ability to prevent formation of, or react with and neutralize, the hydrogen halide evolved when vinyl halide polymers are heated to processing temperatures. The progressive elimination of hydrogen halide from the polymerization chain ("unzipping") yields a polyene chain which is believed to be at least partially responsible for the change in viscosity and color that occurs during heating of the polymer.

Preferred tin compounds are those containing one or more tetravalent tin atom each of which has at least one direct tin-to-sulfur or tin-to-oxygen bond and include the organotin oxides, sulfides, alkoxides, carboxylates, mercaptides, derivatives of mercaptoalcohols and the mercaptoacid and mercaptoalcohol esters. They can be represented by the following formulae:

$(R^4SnZ_{1.5})_x$ $(R^4)_2SnZ$ $(R^4)_aSn(OOCR^5)_{4-a}$ $(R^4)_aSn(SR^6)_{4-a}$ $[(R^4)_cSn(R^6)_{3-c}]_2(Z'_b)_a$ $[(R^4)_aSn]_2(OOCR^5COO)_{4-a}$ $[(R^4)_aSn]_2(ZR^9Z)_{4-a}$ $[(R^4)_aSn]_2(ZR^9COO)_{4-a}$ where
  a is 1 or 2:
  x is an integer from 3 to 20, inclusive;
  Z is oxygen or sulfur;
  Z' is oxygen or sulfur;
  b is an integer from 1 to 4 when Z' is sulfur and is 1 when Z' is oxygen;
  c is 1 or 2;
  $R^4$, $R^5$ and $R^6$ each independently is
substituted or unsubstituted hydrocarbyl, and $R^6$ additionally can be $-R^7-COOR^8$ or $-R^9-OOCR^8$, (where $R^7$ is $C_1-C_{20}$ alkylene), or $R^6$ can be H; $R^8$ is hydrocarbyl; and $R^9$ is $C_2-C_{20}$ alkylene.

Preferred tin-containing compounds include the reaction product of a mono-organotin trihalide, a diorganotin dihalide, or mixture thereof, with an alkali-metal sulfide and one or more of a monocarboxylic acid, a polycarboxylic acid, and more preferably a mercaptan, a mercaptoacid, a mercapto-alcohol, a mercaptoacid ester or a mercaptoalcohol ester.

More preferred tin stabilizers are bridged mercaptide compounds. Preferred sulfur-bridged compounds nominally are represented by the formula

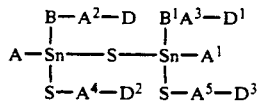

where:
A and $A^1$ are alkyl of 1 to 12 carbon atoms, preferably methyl, butyl and octyl;
$A^2$, $A^3$, $A^4$ and $A^5$ are lower alkylene having the formula $-(CH_2)_n-$
  wherein n is from 1 to 18, with an n of 1 or 2 preferred;
B and $B^1$ are selected from S and O;
D, $D^1$, $D^2$ and $D^3$ each, independently are selected from

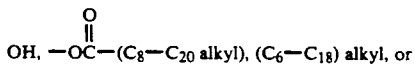

where m is a number from 1 to 8. Although these compounds are described by the above structure, they often exist in equilibrium mixtures of two or more compounds, typically, organotin sulfide, and organotin mercapto compounds.

A preferred group of the tin stabilizer compounds are sulfide containing tin mercaptide-type stabilizer. These compounds contain

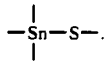

Examples of the stabilizers which fall under the first category include, sulfide containing mercaptides, such as alkylated tins (the alkyl groups are C-1 to C-18 individually and in combination), mercaptoester tins individually and in combination, and non-alkylated tins.

Useful tin mercaptide type stabilizers include
  monobutyltin(isooctylmercaptoacetate)sulfide,
  monobutyltin (dodecylmercaptide)sulfide,
  monobutyltin (mercaptoethyloleate)sulfide,
  monobutyltin trimercaptoethyloleate,
  monobutyltin(hydroxyethylmercaptide)sulfide,
  monobutyltin (mercaptoethyloleate sulfide, dioctyltin bis(isooctylmercaptoacetate), and

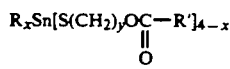

where
  x = 1 or 2
  y = 1 to 18
  R = alkyl group $C_1-C_{12}$
  R' = alkyl group $C_1-C_{18}$ Also useful are tin tetramercaptides such as tin tetra isooctyl mercaptoacetate.

Another useful grouping of tin stabilizers are non-sulfur stabilizing compounds where tin is bonded to oxygen. These compounds contain the

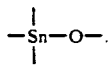

Useful tin compounds in this group include dibutyltin maleate, dibutyltin di(stearyl maleate), and dibutyltin dilaurate.

Non-sulfur tin compounds which are utilized as excellent stabilizing materials alone, or in combination, are organotin carboxylates, or organotin alkoxides.

Tin stabilizer compositions of the present invention include combinations of any of the above compounds. The compositions can be made by individually mixing the stabilizers together, or to actually form two or more of the above-identified stabilizing compounds together in an in situ chemical synthesis. Specific examples of useful tin compounds as listed in Japanese Reference 62-23 6846, hereby incorporated by reference.

Typically, compositions contain from 0.01 to 5.0, preferably 0.01 to 3.0, more preferably 0.1 to 2.0, and most preferably 0.5 to 1.5 percent by weight (or parts per hundred of resin, i.e., phr) of a metal, preferably tin based stabilizer based on the weight of the polymer. Considering the elemental tin in the stabilizer to be the operative material in the tin based stabilizer, such stabilizers can alternatively be based on the weight of the elemental tin in the tin stabilizer. As such, typical compositions contain from 0.005 to 1.0 and preferably 0.005 to 0.5 parts per hundred of tin, based on the halogen containing polymer. More preferably the amount of tin is in the range of from 0.05 to 0.5 parts per hundred of the resin.

The tin stabilizer compound performs the function of preventing decomposition of the polymer during the processing procedure. The stabilizer allows the polymer itself to be molded, calendered or extruded without any type of discoloration or deterioration of the resin itself.

A major disadvantage of the use of any of the above-identified organotin stabilizer compositions is the cost associated therewith. A reduction of the amount of actual metal, i.e., tin stabilizer, would be extremely beneficial in that it will make the use of such stabilizing compounds or compositions a major cost-saving feature for the user. In addition, longer term stability of standard amounts of tin stabilizers would also be extremely useful.

There is from 0.01 to 10, preferably 0.1 to 3, more preferably 0.2 to 2.5 percent based on the halogen containing polymer of at least one Group Ia metallic carboxylate salt. The metal carboxylic salts useful in the present invention contain at least one carboxylic acid or derivative thereof selected from carboxylic acids having at least two carboxyl groups, at least one carboxyl group and at least one hydroxyl group, at least one carboxyl group and at least one mercaptan and aromatic carboxylic acids or derivatives thereof having at least one carboxyl group. The metal cation of the metal carboxylic salts is based on metals selected from the group consisting of metals from Groups Ia, Ib, IIIa, IVa, IVb, VA VIIb and VIII, with Group Ia metal salts preferred. Useful salts include the salts of transition metals. The salts can be the salts of di or polycarboxylic compounds having 2 to 54 carbons. The most preferred salt is disodium adipate.

Useful metal salts include the mono metallic and di metallic salts of dicarboxylic acids, mono metallic salts of mono esters of dicarboxylic acids, metal salts of aromatic carboxylic acids having at least one carboxylic group, and metal salts of compounds containing at least one carboxylic group and at least one hydroxyl group or mercaptan group. Also useful are polymeric carboxylates within the above groups. Particularly preferred polymeric carboxylate salts are polyacrylate salts including the salts of polyacrylic acid, polymethacrylic acid, as well as partially saponified esters such as partially saponified polyacrylate type polymers including polyacrylate, polymethacrylate, and poly(ethylhexylacrylate) and copolymers of such polymers.

Useful salts also include compounds having the formula $(CH_2)_n(CO_2Me)_2$ wherein Me is a metal and n can be from 2 to 24, and preferably is from 2 to 18. Other preferred salts include sodium butyl maleate, tetra sodium salt of ethylenediamine, tetra sodium butane tetracarboxylate, tetra-acetic acid, poly(butadiene maleic acid sodium salt), sodium isooctyl maleate, sodium isooctyl succinate, sodium hexylmaleate, sodium decylmaleate, sodium dodecylmaleate, disodium adipate, polycarboxylic acid salts, sodium salts of polyacrylates, polyacrylic acid (PAA), polymethacrylic acid (PMA), poly(2-ethylhexyl acrylate) (POA), wherein at least 25, and preferably at least 33, more preferably at least 50 mole percent of the carboxyl groups are neutralized, sodium cinnamate, sodium salts of $(CH_2)_n(CO_2Na)_2$ where n is from 2 to 24, and preferably 2 to 10, NaO-(O)CCH$_2$CH(CH$_2$CH=CH—C$_9$H$_{19}$)CO$_2$Na, [NaO-(O)C—CH=CH—C(O)OCH$_2$CH$_2$]$_2$—O,

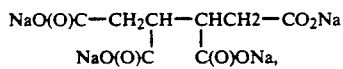

butane-1,2,3,4-tetracarboxylic acid tetrasodium salt, disodium maleate dihydrate, disodium phthalate, 1,2,4benzenetricarboxylic acid sodium salt, 1,2,4,5-benzenetetracarboxylic acid sodium salt, disodium succinate, disodium terephthalate, disodium oxalate, sodium benzoate, sodium thioglycolate, HS—CH$_2$—C(O)ONa, sodium t—C$_4$H$_9$—C$_6$H$_4$—C(O)ONa, sodium t-butylbenzoate, 3-CH$_3$—C$_6$H$_4$—C(O)ONa sodium 3-methylbenzoate, disodium glutarate NaO(O)C—(CH$_2$)$_3$—C(O)ONa, sodium glycolate, NaO(O)C—CH$_2$—OH, dipotassium glutarate KO(O)C—(CH$_2$)$_3$—C(O)OK, dipotassium phthalate KO(O)C—(C$_6$H$_4$)—C(O)OK, sodium hexanoate, sodium octanoate, sodium decanoate, disodium sebacate NaO(O)C—(CH$_2$)$_8$—C(O)ONa, dehydroacetic acid sodium salt, dipotassium adipate, potassium adipate, disodium succinate, dipotassium phthalate, polyacrylic acid 100% Na salt.

Preferred sodium salts are selected from the group consisting of monosodium and disodium salts of adipic and maleic acid and esters thereof. The most preferred adipic acid based salt is disodium adipate. The preferred salts of maleic acid are monosodium salts of monoesters of maleic acid. The esters are preferably alkyl esters of the acid and an alcohol having from 1 to 22 and preferably from 3 to 18 carbon atoms. The most preferred ester salts are sodium hexyl maleate, sodium octyl maleate, sodium decyl maleate and sodium dodecyl maleate.

A particularly preferred composition of the present invention comprises poly(vinyl chloride) or chlorinated poly(vinyl chloride). A preferred organotin compound, can include alkyl (mercapto)tin and alkyl (mercapto)ester tin compounds in an amount (based on elemental tin) of about 01 to 0.8 percent based on the weight of polymer. There is about 0.1 to 0.8 percent based on the weight of the polymer of disodium adipate or a monosodium salt of a monoester including sodium hexyl maleate, sodium octyl maleate, sodium decyl maleate and sodium dodecyl maleate.

The compositions of this invention can also contain one or more conventional additives, including mold release agents, colorants, including dyes and pigments, anti-oxidants, flame-retardants, fibrous and particulate fillers and reinforcements, plasticizers, and the like.

The compositions are typically physically mixed. The components can be mixed in powder blending equipment such as a ribbon blender or HENSCHEL mixer, typically at room temperature. The temperature may rise due to the heat of mixing. The mixed composition can then be melt processed such as extruding, pelletizing, injection molding and the like. The compositions of this invention can be melt blended in a suitable melt blender such as a screw extruder, or other conventional plasticating devices such as a BRABENDER ®, BANBURY mixer, mill or the like.

The composition can be melt blended at a temperature greater than the melt temperature of the highest melting point polymer. Preferably, the composition is melt blended at a temperature at least 10° C. greater than the melt temperature of the highest melting point polymer in the composition, and less than the temperature at which there is significant degradation. More preferably the composition is made by melt blending at from 10° C. to 75° C., and yet more preferably 10° C. to 30° C. above the melt temperature of the melt temperature of the poly(vinyl chloride) in the composition. Typical temperatures range from 180° to 250° C.

The compositions can be made into a wide range of useful articles by conventional methods employed in the fabrication of thermoplastic articles, i.e., as molded parts, extruded shapes, e.g., tubing, films, sheets, fibers, laminates and wire coating. "Molding" means forming an article by deforming the blend in the heated plastic state.

The dynamic stability of the compositions can be monitored with a rheometer, such as a BRABENDER ® PLASTICORD rheometer. The performance of the various stabilizer additives is indicated by Stability Time in minutes. Stability Time can be defined based on a torque measurement using the BRABENDER ® torque rheometer. A sample is put into a sample chamber of the torque rheometer and heats up as the rotors rotates. Initially, a Fusion Time is determined. The Fusion Time is the time for the powder to become molten. The fusion torque is a measure of work at Fusion Time in meter grams. As the sample becomes molten and the viscosity decreases, the torque decreases. The sample achieves an Equilibrium Torque at an Equilibrium time (minutes) which remains substantially constant or slightly decreasing. The composition remains in the molten state as indicated by the Equilibrium Torque value. When the composition begins to crosslink an increase in torque is observed. The term Stability Time is the time the composition begins to degrade or crosslink as shown by an increase in torque above the Equilibrium Torque value minus the Fusion Time.

Static stability is determined from milled sheets of the composition. Typically, a 225 g sample of the composition, i.e., PVC composition, is kneaded using a 13 inch 2-roll FARRELL mill at 325° F. for 5 minutes. The sample is pressed in a hydraulic press at 375° F. for 5 minutes. The pressed sample is put in an oven at a given temperature, i.e., 190° C., and the time the sample darkens is recorded as the static stability.

The following examples illustrate the practice of the present invention. The examples should not be construed as limiting the invention to anything less than that which is disclosed or which would have been obvious to one of ordinary skill in the art therefrom. Parts are parts per hundred parts of resin (phr) unless otherwise indicated. Molecular weights are weight average molecular weights unless otherwise indicated.

Following is a listing of tin based stabilizers used in the Examples.

|  | wt. % | Elemental Tin (wt. %) |
|---|---|---|
| A is a mixture of: |  | 19% Tin |
| mono- and di | 25 mono |  |
| methyl tin mercaptoester | 75 di |  |
| B is a mixture of: |  | 32% Tin |
| monobutyltin 2-mercaptide sulfide, | 80 |  |
| mercaptoethyl tallate, and | 5 |  |
| inert diluent | 15 |  |
| C is monobutyl tin tris(isooctylmercaptoacetate) |  | 15% Tin |
| D is a mixture of: |  | 17% Tin |
| monobutyltin mercaptoester, and | 15 |  |
| dibutyltin mercaptoester | 85 |  |
| E is a mixture of: | 14.5% Tin |  |
| mono and dioctyltin, and | 33% (mono) |  |
| (isooctyl mercaptoacetate) | 67% (di) |  |
| F is a bridged sulfide of |  | 22% Tin |
| a butyl tin containing mercaptoester |  |  |
| G is a sulfide bridge tin mercaptoester |  | 21% Tin |
| H is dibutyltin bis (isooctylmaleate) |  | 17% Tin |
| K is a mixture of; |  | 12% Tin |
| B, and | 43% |  |
| dodecyl mercaptan | 53% |  |
| L dibutyltin bis (isooctylmercaptoacetate) |  | 18.5% Tin |
| M mixture of: |  |  |
| K and | 67% | — |
| dibutyltin mercaptoester sulfide | 33% | — |
| N butyltin mercaptoester sulfide |  | 25% Tin |
| P antimony tris(isooctylmercaptoacetate) |  |  |
| Q Barium/cadmium soap |  |  |
| R is dibutyltin maleate |  | 33% Tin |
| S is monosulfidebutyltin mercaptoester |  | 10% Tin |

EXAMPLES 1-7

Evaluations were conducted initially to study potential salts to determine whether or not metal salts of polycarboxylate could effectively be used to enhance the stabilization properties of tin stabilizing compounds in poly(vinyl chloride) based compositions. The formulations contain 100 parts by weight of poly(vinyl chloride) manufactured by Shintech, Inc. as SE 650 which is reported to have a K value of 57 when measured according to DIN 53726 test procedure, and an inherent viscosity of 0.68 measured according to ASTM 1243 test procedure. Each composition contained 3.0 parts by weight per hundred (phr) of calcium carbonate; 0.3 phr of calcium stearate; 1.5 phr of a commercial PVC lubricant LOXIOL 7109 which is sold by Henkel Chemical as 70 weight percent of G-30 (based on a mono fatty acid ester of fatty alcohols) and 30 weight percent of G-70 (based on complex esters of saturated fatty acids); and 1.0 phr of titanium dioxide. This composition is useful for injection molding.

Each sample was first physically mixed using a HENSCHEL mixer. The samples were then tested using a BRABENDER ® torque rheometer at 200° C. Rotor speed was initially 60 RPM and then after one minute raised to 120 RPM. A charge of 62 grams was fed to the torque rheometer. Stability was measured as the difference between the time crosslinking begins minus Fusion Time as defined above.

The tin based stabilizer A was used in Control 1. Control 2, Example 1-7 and Comparative 1 contained stabilizer B and additionally contained 0.42 phr of dodecyl mercaptan ($C_{12}H_{25}SH$) (DDM). Comparative 1 contained stabilizer C and 0.42 phr of DDM. Results are reported on Table 1 below.

TABLE 1

| | Stabilizer (phr Sn) | Sodium Salt (phr) | Stability Time (Min.) |
|---|---|---|---|
| Cont. 1 | A (0.30) | none | 10.8 |
| Cont. 2 | B (0.12) | none | 8.3 |
| Ex. 1 | B (0.12) | Na$_2$Adipate (1.2) | 12.3 |
| Ex. 2 | B (0.12) | SMA (1.2) | 7.6 |
| Ex. 3 | B (0.12) | NaOctnoate (1.2) | 7.6 |
| Ex. 4 | B (0.12) | NaBuM[1] | 8.6 |
| Ex. 5 | B (0.12) | Na$_4$TMEDA[2] (1.6) | 9.1 |
| Ex. 6 | B (0.12) | Na$_4$BuTC[3] (1.0) | 8.5 |
| Comp. 1 | C (0.12) | DSP[5] (2.0) | 12.9 |
| Ex. 7 | B (0.12) | MALDENE[4] (1.2) | 8.4 |

[1]NaBuM = sodium butyl maleate.
[2]Tetra sodium salt of ethylenediamine tetra-acetic acid.
[3]Na$_4$BuTC = tetra sodium butane tetracarboxylate.
[4]Poly(butadiene maleic acid sodium salt) sold by Borg-Warner sold as MALDENE ®.
[5]Disodium hydrogen phosphate.

Referring to Table 1 the Control 1 composition stabilized only with the organo tin compound (A) (0.30 phr elemental tin) had a Stability Time of 10.8 minutes. Control 2 contained 0.12 elemental tin (B) phr, and no additional stabilizer. It had a stability time of 8.3 minutes. Disodium phosphate the subject of a commonly assigned patent application was used in Comparative 1 and resulted in an excellent stability of 12.9. Example 1 used disodium adipate in an amount of 1.2 phr, and sufficient B to give 0.12 phr of tin. This resulted in an excellent stability time of 12.3 minutes. Examples 2 through 6 used a variety of additives including styrene maleic anhydride sodium salt copolymer in Example 2, sodium octanoate in Example 3, sodium butyl maleate in Example 4, tetra sodium salt of ethylenediamine tetra-acetic acid in Example 5, and tetra sodium butane in Example 6 and MALDENE ® which is butadiene maleic anhydride copolymer sodium salt in Example 7. A review of the stability times showed Example to have excellent results suggesting that while Examples 2-7 had similar results to Control 2, more study would be conducted The results of which are presented below.

EXAMPLES 8-9

Example 8 was conducted to illustrate the use of the composition of the present invention for formulating packaging articles which require clarity. Control 3 contained 1 6 part phr of D. Example 8 contained 1.0 phr of D plus 1.0 phr of sodium isooctyl maleate (NaIOM) Example 9 contained 1.0 phr of D and 1.0 phr of sodium isooctyl succinate (Na IOS). Dynamic Stability and haze measurements were made. Haze measurements were made according to ASTM D1003-61 (1977) with initial haze value recorded and haze after 7 day exposure to water. The lower the haze value, the clearer the sample. Stability Time was measured according to the method of Example 1.

TABLE 2

| | Stabilizer phr | Process Stability Time Min. | Initial Haze | Haze After 7 Days |
|---|---|---|---|---|
| Cont. 3 | D 1.6 | 12.1 | 10.2 | 10.1 |
| Ex. 8 | D 1.0 Na IOM 1.0 | 16.5 | 9.9 | 12.4 |
| Ex. 9 | D 1.0 Na IOS 1.0 | 10.3 | 13.8 | 19.4 |

Table 2 shows that Example 8 not only had improved haze results compared to Control 3 but unexpectedly had improved haze results compared to Example 9.

EXAMPLES 10-12

Stabilized PVC compositions containing conventional additive packages except for stabilizer systems were evaluated using D (1.0 phr) and sodium maleate esters (1.0 phr). Controls 4 and 5 contain only stabilizer D (1.6 phr in Control 4 and 1.0 phr in Control 5). The maleate esters (hexyl, octyl, decyl and dodecyl) were prepared by heating equal molar amounts of alcohol and maleic anhydride until a homogeneous solution was obtained. The same procedure was used for the other esters. The esters were then treated with sodium hydroxide to form the ester salts. MACBETH colorimeter data are summarized in Table 3 with the yellowness Index (YI) measured according to ASTM D1925. The higher the number, the more yellow the sample. Milled sheets were used to evaluate haze (clarity). 225 gram samples were milled on a 13-inch, 2-roll FARRELL mill. The sample was pressed at 375° F. for 5 minutes. Dynamic Stability Time was measured as in Example 1. Results are summarized on Table 3.

TABLE 3

| Stabilizer/ Salt (phr) | Dynamic Stability Time (Min.) | YI (Mins.) 2 | 4 | 6 | 8 | Initial Haze |
|---|---|---|---|---|---|---|
| Cont. 4 D (1.6) | 14.5 | 22 | 32 | 40 | 52 | 13.1 |
| Cont. 5 D (1.0) | 9.0 | 21 | 25 | 43 | 63 | 9.5 |
| Ex. 10 D (1.0) Na hexylmaleate (1.0) | 15.0 | 28 | 40 | 50 | 81 | 10.3 |
| Ex. 11 D (1.0) Na decylmaleate (1.0) | 12.0 | 31 | 32 | 43 | 52 | 8.2 |
| Ex. 12 D (1.0) Na dodecylmaleate (1.0) | 15.5 | 32 | 41 | 61 | 85 | 8.7 |

EXAMPLE 13

Example 11 was repeated. Haze tests show that the stabilizer composition of Stabilizer D (1.0 phr) and sodium decyl maleate (1.0 phr) does not haze through 3 weeks of water exposure. Control 6 contained 1.6 phr of D and no sodium salt. The results are summarized in Table 4.

TABLE 4

| | Initial Haze | 1 Week | 2 Weeks | 3 Weeks |
|---|---|---|---|---|
| Cont. 6 | 13.1 | 13.9 | 14.9 | 11.4 |
| Ex. 13 | 8.8 | 8.1 | 8.8 | 9.3 |

EXAMPLES 14-17

This Example illustrates the reduction in tin necessary to stabilize a PVC composition with disodium adipate (DSA). A composition was physically blended containing 250 grams of PVC made by Atochem as RB 8010. The composition contained 8 phr of impact modifier, 1 phr of epoxidized soybean oil; 0.6 K-175 and 0.4 K-120 processing aids from Rohm and Haas; 0.6 phr of paraffin wax and 0.4 phr LOXIOL G74 (based on complex esters of saturated fatty acids). The stability was tested using the roll mill procedure of Examples 10-13. Static stability is the time color of the sample begins to darken. The results are summarized in Table 5.

TABLE 5

|  | Cont. 7 | Ex. 14 | Ex. 15 | Ex. 16 | Ex. 17 |
|---|---|---|---|---|---|
| E (phr) | 1.2 | 1.2 | 1.2 | 1 | 0.8 |
| DSA (phr) | — | 0.1 | 0.2 | 0.2 | 0.2 |
| Static Stability (min) 192° C. | 50 | 58 | 60 | 58 | 55 |
| Initial Y. I. | 22.1 | 26.1 | 25.5 | 27.6 | 31.6 |

EXAMPLES 18-22

Evaluations were conducted using compositions containing 2500 g of PVC (as recited in Examples 1-7), lubricants sold by Henkel Chemical as G-70 (a mono fatty acid of fatty alcohol) (11.25 g), G-30 (complex esters of saturated fatty acids) (26.25 g), calcium stearate (7.5 g), calcium carbonate (75 g), TiO2 (25 g), and organotin (17 g) mercaptide ester, compound F. The amount of tin compound was 0.68 phr (0.15 phr elemental tin). The composition contained varying amounts of disodium adipate (DSA). The PVC formulation was physically mixed and then tested.

The blends were melt blended using a BRABENDER ® torque rheometer as indicated in Example 1. Results are summarized in Table 6 below.

TABLE 6

| Material | Control 8 | Ex. 18 | Ex. 19 | Ex. 20 | Ex. 21 | Ex. 22 |
|---|---|---|---|---|---|---|
| DSA (g) | — | 25 | 62.5 | 125 | 187.5 | 250 |
| DSA phr | — | 1 | 2.5 | 5 | 7.5 | 10 |
| Stability time (min) | 5.8 | 13.55 | 16.6 | 14.7 | 14.2 | 9.2 |
| Fusion Torque (m-gm) | 2500 | 2400 | 2300 | 2700 | 2950 | 3500 |
| Equil Torque (m-gm) | 900 | 900 | 900 | 900 | 850 | 900 |

EXAMPLE 23

An injection molding PVC formulation was evaluated. A mixed powder composition was supplied by an injection molding company without stabilizer. Control 9 contained 1.4 phr of Stabilizer A and had 0.26 phr of elemental tin. Control 10 contained 2.7 phr of Stabilizer F and had 0.26 phr of elemental tin. Example 23 contained 1.4 phr of F and had 0.42 phr DSA having a particle size of 26 micrometers. DSA was used as a costabilizer. Notched Izod impact strength was tested according to ASTM D256. Each sample was evaluated nine times and hinge (ductile) breaks noted. A ductile break indicates the sample is not brittle. Stability and YI were measured according to previously described procedures. Table 7 below summarizes various tin compounds used and results.

TABLE 7

| Stabilizer System | Notched Izod (ft.lb/in) | Hinge Breaks | Brab Stab (min) | YI 6' | 8' |
|---|---|---|---|---|---|
| Control 9 1.4 phr A .26 phr Sn | 16.9 | 9/9 | 12.3 | 17 | 24 |
| Control 10 2.7 phr F .26 phr Sn | 17.5 | 9/9 | 11.0 | 13 | 16 |
| Example 23 1.4 phr F .14 phr Sn .42 phr DSA | 18.4 | 9/9 | 12.3 | 19 | 26 |

In Example 23, the DSA used had a particle size of 26 µm in average diameter. Evaluation with particles greater than 74 µm had poorer impact properties but satisfactory stability and YI. Similar evaluations with disodium phosphate had satisfactory stability and YI but also had poorer Izod impact properties.

EXAMPLE 24

This Example illustrated the use of a bridging sulfide tin mercapto ester "G". The composition contained 100 phr of PVC (2500 grams), 1 phr processing aid, 10 phr TiO2, 1.75 phr Ca Stearate, 5 phr CaCO3, 0.15 phr oxidized polyethylene wax, 1.0 phr paraffin wax, 6 phr DURASTRENGTH D-200, a modified acrylic impact modifier, 1 phr "G" (0.218 phr elemental tin). This composition is useful for extrusion of "vinyl" siding. Control 11 contained no sodium salt of the present invention. Example 24 contained 0.48 phr of disodium adipate. Results are summarized in Table 8 below.

TABLE 8

|  | Control 11 | Example 24 |
|---|---|---|
| Stability (min) | 30.5 | 35 |
| YI 2 | 6.0 | 5.3 |
| 4 | 7.3 | 6.2 |
| 6 | 8.4 | 8.2 |
| 8 | 8.2 | 8.0 |
| 10 | 8.5 | 8.1 |
| 15 | 10.0 | 9.1 |
| 20 | 12.9 | 10.8 |
| 25 | 18.2 | 13.5 |
| 30 | 25.5 | 15.1 |

EXAMPLES 25-33

A series of experiments was conducted to determine whether polycarboxylic salts would be useful to enhance the stabilization of poly(vinyl chloride) compositions. The experiments were conducted using PVC G-86 made by B. F. Goodrich with a K value between 55 and 58. The compositions each contained 1.5 phr of Loxiol as defined in Examples 1-7; 1.5 phr of stabilizer C. The polycarboxylic salts include the partially saponified polyacrylates, polyacrylic acid (PAA), polymethacrylic acid (PMA), and poly(2-ethyhexyl acrylate) (POA). The molecular weight, mole percent neutralization with sodium cation and phr of the polycarboxylic acid in the composition is summarized in the Tables below. Stability was determined based on stability time in minutes as defined above. The results of each experiment are summarized in Tables 9-12 respectively. In the experiment in Table 12, 1.0 phr of stabilizer C was used rather than 0.5 phr as in Tables 9-11.

TABLE 9

| | Sodium Salt | M.W. | Mole % Na | PHR | Stability Time (min.) |
|---|---|---|---|---|---|
| Cont. 12 | None | | | — | 6 |
| Ex. 25 | PAA | 90,000 | 33 | 0.8 | 6.5 |
| Ex. 26 | PAA | 5,000 | 33 | 0.8 | 7.0 |
| Ex. 27 | PMAA | n.a. | 33 | 0.8 | 9.5 |

TABLE 10

| | Sodium Salt | M.W. | Mole % Na | PHR | Stability Time (min.) |
|---|---|---|---|---|---|
| Cont. 13 | None | | | — | 6.5 |
| Ex. 28 | PAA | 2,000 | 33 | 1.0 | 9.5 |
| Ex. 29 | PAA | n.a. | 100 | 0.64 | 9.0 |

TABLE 11

| | Sodium Salt | M.W. | Mole % Na | PHR | Stability Time (min.) |
|---|---|---|---|---|---|
| Cont. 14 | None | | | — | 6.5 |
| Comp. 2 | PAA | 2,100 | 0 | 0.72 | 5.5 |
| Ex. 30 | PAA | 2,100 | 16.7 | 0.8 | 11 |
| Ex. 31 | PAA | 2,100 | 33 | 0.8 | 14 |
| Ex. 32 | PAA | 2,100 | 50 | 0.8 | 20.5 |

TABLE 12

| | Sodium Salt | Mole % | Na PHR | Stability Time (min.) |
|---|---|---|---|---|
| Cont. 15 | None | | — | 9.6 |
| Ex. 33 | POA | 50 | 1.6 | 16.8 |

The above Examples illustrate that the stability of poly(vinyl chloride) neutralized with stabilizer C which is a tin based compound can be significantly enhanced by the inclusion of the sodium salt of a partially or fully neutralized polycarboxylic acid. Reference is made to Comparative 2 which shows the nonstabilizing enhancing results when a non-neutralized polyacrylic acid was used compared to even neutralization with 16.1 mole percent sodium cation.

EXAMPLES 34, 35

Example 34 and 35 were melt blended composition containing PVC G-86, 1.5 phr of LOXIOL, sodium isooctyl maleate (NaIOM) with tin stabilizers C and H. Results are summarized in Table 13 below.

TABLE 13

| | Stabilizer | PHR | NaIOM PHR | Stability Time (min.) |
|---|---|---|---|---|
| Cont. 16 | C | 1.0 | — | 14 |
| Ex. 34 | C | 1.0 | 0.58 | 23 |
| Cont. 17 | H | 1.8 | — | 11 |
| Ex. 35 | H | 1.8 | 0.58 | 15.5 |

EXAMPLES 36, 37

The use of sodium cinnamate was evaluated in compositions containing PVC G-86, 1.5 phr of LOXIOL, the indicated tin stabilizer with results summarized in Table 14.

TABLE 14

| | Stabilizer | PHR | Na Cinnamate PHR | Stability Time (min.) |
|---|---|---|---|---|
| Cont. 18 | C | 1.0 | — | 8.9 |
| Ex. 36 | C | 1.0 | 0.72 | 14.4 |
| Cont. 19 | H | 1.6 | — | 7.0 |
| Ex. 37 | H | 1.6 | 0.72 | 13.4 |

EXAMPLE 38, 39

A formulation containing PVC G-86, 1.5 phr of LOXIOL and tin stabilizer C at 1.0 phr and the sodium salts of $(CH_2)_n(CO_2Na)_2$ where n - 8 (I) and n=10 (II). Results are summarized in Table 15.

TABLE 15

| | Stabilizer | PHR | Na$_2$ Salt | PHR | Stability Time (min.) |
|---|---|---|---|---|---|
| Cont. 20 | C | 1.0 | — | | 9.6 |
| Ex. 38 | C | 1.0 | (I) | 0.62 | 14.8 |
| Ex. 39 | C | 1.0 | (II) | 0.69 | 16.5 |

EXAMPLES 40, 41

A commercially available non-plasticized (rigid) poly(vinyl chloride) composition was evaluated using disodium adipate (DSA) and acid salt (I) as reviewed above in Examples 38 and 39. Results are summarized on Table 16.

TABLE 16

| | Stabilizer | PHR | Na$_2$ Salt | PHR | Stability Time (min.) |
|---|---|---|---|---|---|
| Comp. 3 | A | 1.6 (30% tin) | — | | 9.6 |
| Cont. 21 | K | 0.8 (12% tin) | — | | 9.0 |
| Ex. 40 | K | 0.8 (12% tin) | DSA | 1.3 | 14.6 |
| Ex. 41 | K | 0.8 (12% tin) | (I) | 1.7 | 15.9 |

EXAMPLES 42, 43

A formulation containing PVC 650 of the type used in Examples 1–7, 2.1 phr of methacrylate butadiene styrene (MBS) based impact modifier supplied by Atochem, 2.0 parts phr of methyl methacrylate copolymer as a processing aid supplied by Atochem, 0.4 phr of wax, 1.2 phr of LOXIOL G-15 and the listed tin stabilizers were evaluated with acid salts (I) and (II) as defined with regard to Examples 38 and 39 above. Results are summarized in Table 17.

TABLE 17

| | Stabilizer | PHR | Salt | PHR | Stability Time (min.) |
|---|---|---|---|---|---|
| Cont. 22 | C | 1.5 | — | | 20 |
| Ex. 42 | C | 1.5 | (I) | 1.0 | 42 |
| Ex. 43 | C | 1.5 | (II) | 1.0 | 29 |

EXAMPLES 44, 45

A composition containing PVC G-86, 1.5 phr of LOXIOL 7109, stabilizer H, and the sodium salts NaO(O)C—CH$_2$CH(CH$_2$CH=CH—C$_9$H$_{19}$)CO$_2$Na (III) [NaO(O)C—CH=CH—C(O)O—CH$_2$CHC$_{H2}$]$_2$—O (IV). The compositions were evaluated with the following results summarized in Table 18.

TABLE 18

| | Stabilizer | PHR | Salt | PHR | Stability Time (min.) |
|---|---|---|---|---|---|
| Cont. 23 | C | 1.0 | — | | 10.2 |

TABLE 18-continued

| | Stabilizer | PHR | Salt | PHR | Stability Time (min.) |
|---|---|---|---|---|---|
| Ex. 44 | C | 1.0 | (III) | 0.8 | 18.6 |
| Ex. 45 | C | 1.0 | (IV) | 1.0 | 13.7 |

EXAMPLES 46, 47

A formulation was evaluated which contained PVC G86, 1.5 phr of LOXIOL 7109, stabilizer C, and sodium salts (V) and (VI).

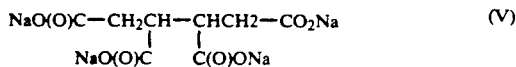

Butane-1,2,3,4-tetracarboxylic acid tetrasodium salt

Disodium Maleate dihydrate (VI) Results are summarized in Table 19 below.

TABLE 19

| | Stabilizer | PHR | Salt | PHR | Stability Time (min.) |
|---|---|---|---|---|---|
| Cont. 24 | C | 1.0 | — | | 9.5 |
| Ex. 46 | C | 1.0 | (V) | 0.6 | 24.5 |
| Ex. 47 | C | 1.0 | (VI) | 1.0 | 19.0 |

EXAMPLES 48, 49

A composition was prepared using PVC G-86, 1.45 phr of LOXIOL 7109, tin stabilizers L and M, and disodium phthalate (VII). Results are summarized on Table 20 below.

TABLE 20

| | Stabilizer | PHR | (VII) PHR | Stability Time (min.) |
|---|---|---|---|---|
| Cont. 25 | L | 0.8 | — | 8.3 |
| Ex. 48 | L | 0.8 | 0.4 | 12.3 |
| Cont. 26 | M | 0.97 | — | 6.8 |
| Ex. 49 | M | 0.97 | 0.4 | 12.7 |

EXAMPLES 50, 51

A composition was prepared which contained PVC G86, 1.5 phr of LOXIOL 7109, and tin stabilizers K and H, as well as disodium phthalate (VII). Results of stability testing are presented in Table 21 below.

TABLE 21

| | Stabilizer | PHR | (VII) PHR | Stability Time (min.) |
|---|---|---|---|---|
| Cont. 29 | L | 0.4 | — | 10.5 |
| Ex. 50 | L | 0.4 | 1.05 | 31.5 |
| Cont. 28 | C | 0.25 | — | 13.0 |
| Ex. 51 | C | 0.25 | 1.05 | 19.5 |

EXAMPLES 52-57

Compositions containing PVC G-86, 1.5 phr of LOXIOL, and stabilizers C and L were prepared with a variety of sodium acid salts (V) to (XII) which are:
1,2,4-benzenetricarboxylic acid sodium salt (VIII)
1,2,4,5-benzenetetracarboxylic acid sodium salt (XXXV)
Disodium succinate (IX)
Disodium terephthalate (X)
Disodium oxalate (XI)
Sodium benzoate (XII)

The salts were evaluated in accordance with BRABENDER® stability testing. The testing was conducted as recited above. A sample was removed every two minutes and pressed into the form of a small disc which was examined for color. Results are reported in Time (minutes) to blacken the chip.

Results are summarized in Table 22 below.

TABLE 22

| | Stabilizer | PHR | Salt | PHR | Time to Blacken |
|---|---|---|---|---|---|
| Cont. 29 | C | 0.25 | | — | 6 |
| Ex. 52 | C | 0.25 | (VIII) | 0.7 | 20 |
| Ex. 53 | C | 0.25 | (XXXV) | 0.7 | 20 |
| Ex. 54 | C | 0.25 | (IX) | 0.5 | 20 |
| Ex. 55 | C | 0.25 | (X) | 1.05 | 18 |
| Ex. 56 | C | 0.25 | (XI) | 0.7 | 8 |
| Cont. 30 | L | 0.4 | | — | 8 |
| Ex. 57 | L | 0.4 | (IX) | 0.4 | 16 |

EXAMPLES 58-59

A composition was melt blended which contained PVC G-86, 1.5 phr of LOXIOL 7109, stabilizer L and sodium salts, sodium benzoate (XII), and sodium thioglycolate (XIII), having the formula:

Sodium benzoate (XII)

HS—CH$_2$—C(O)ONa (XIII) Sodium thioglycolate

Results are reported in Table 23 below.

TABLE 23

| | Stabilizer | PHR | Salt | PHR | Time to Blacken |
|---|---|---|---|---|---|
| Cont. 31 | L | 0.4 | | — | 10 |
| Ex. 58 | L | 0.4 | XII | 1.5 | 20 |
| Ex. 59 | L | 0.4 | XIII | 0.38 | 20 |

EXAMPLES 60-63

Compositions were melt blended which contained PVC G-86, 1.5 phr of LOXIOL 7109, stabilizers C & L, and sodium salts HS—CH$_2$—C(O)ONa (XIII) Sodium thioglycolate
t—C$_4$H$_9$—C$_6$H$_4$—C(O)ONa (XIV) Sodium t-butyl-benzoate
3-CH$_3$—C$_6$H$_4$—C(O)ONa (XV) Sodium 3-methyl-benzoate Results are summarized in Table 24 below.

TABLE 24

| | Stabilizer | PHR | Salt | PHR | Time to Blacken |
|---|---|---|---|---|---|
| Cont. 32 | C | 0.24 | | — | 6 |
| Ex. 60 | C | 0.24 | XIII | 1 | 14 |
| Ex. 61 | C | 0.24 | XIV | 1 | 20 |
| Ex. 62 | C | 0.24 | XV | 0.8 | 20 |
| Cont. 33 | L | 0.4 | | — | 7 |
| Ex. 63 | L | 0.4 | XIV | 1 | 17.5 |

EXAMPLES 64-66

Compositions were melt blended which contained PVC G-86, 1.5 phr of LOXIOL, stabilizer C, and acid XVI and XVII, having the following formulas:

Disodium succinate (IX) NaO(O)C—(CH$_2$)$_2$—C(O)ONa

Disodium glutarate (XVI) NaO(O)C—(CH$_2$)$_3$—C(O)ONa

Sodium glycolate (XVII) NaO(O)C—CH$_2$—OH

The results are summarized in Table 25 below.

TABLE 25

| | Stabilizer | PHR | Salt | PHR | Time to Blacken |
|---|---|---|---|---|---|
| Cont. 34 | C | 0.25 | — | | 4.5 |
| Ex. 64 | C | 0.25 | IX | 0.4 | 11 |
| Ex. 65 | C | 0.25 | XVI | 0.4 | 10.5 |
| Ex. 66 | C | 0.35 | XVII | 0.4 | 11 |

EXAMPLES 67-72

A melt blended composition was prepared which contained PVC G-86, 1.5 phr of LOXIOL 7109, and stabilizers L or C and sodium salts (XVI), (XVIII) or (XIX) as follows:

Disodium glutarate (XVI) NaO(O)C—(CH$_2$)hd—C(O)ONa

Dipotassium glutarate (XVIII) KO(O)C—(CH$_2$)$_3$—C(O)OK

Dipotassium phthalate (XIX) KO(O)C—(C$_6$H$_4$)-C(O)OK

The results are summarized in Table 26 which follows.

TABLE 26

| | Stabilizer | PHR | Salt | PHR | Time to Blacken |
|---|---|---|---|---|---|
| Cont. 35 | L | 0.8 | — | — | 5.7 |
| Ex. 67 | L | 0.8 | XIX | 0.23 | 12.2 |
| Ex. 68 | L | 0.8 | XIX | 0.46 | 14.7 |
| Ex. 69 | L | 0.8 | XVIII | 0.4 | 13.5 |
| Ex. 70 | L | 0.8 | XVI | 0.46 | 12.5 |
| Cont. 36 | C | 1.0 | — | — | 8.3 |
| Ex. 71 | C | 1.0 | XIX | 0.23 | 10 |
| Ex. 72 | C | 1.0 | XIX | 0.46 | 13 |

EXAMPLES 73-82

A composition was melt blended which contained poly(vinyl chloride) PVC 750 made by Shintech having a K value of 59, 1 part of LOXIOL 7111 which is a mixture of a simply fatty acid ester and a polymer complex ester of a saturated fatty acid, 2 parts of METABLEN P550 polymethacrylate processing aid, 10 parts of METABLEN C-201 methacrylate-butadiene-styrene impact modifier, as recited above, 0.3 parts of LOXIOL G-70S which is a polymeric complex ester of a saturated fatty acid, 0.15 parts of A-C 629 polyethylene wax made by Allied-Signal Inc., 0.02 parts of Ultra Marine Toner and sodium salts as from the following group:

| Sodium Hexyl maleate | (XX) |
|---|---|
| Sodium octyl maleate | (XXI) |
| Sodium decyl maleate | (XXII) |
| Sodium dodecyl maleate | (XXIII) |
| Sodium isooctyl maleate | (XXIV) |
| Sodium butyl maleate | (XXV) |
| Sodium hexanoate | (XXVI) |
| Sodium octanoate | (XXVII) |
| Sodium decanoate | (XXVIII) |
| Sodium isooctylsuccinate | (XXIX) |

Results are summarized in Table 27 which follows.

TABLE 27

| | Stabilizer | PHR | Salt | PHR | Brabender Stability (min.) |
|---|---|---|---|---|---|
| Cont. 37 | D | 1.0 | — | | 9.0 |

TABLE 27-continued

| | Stabilizer | PHR | Salt | PHR | Brabender Stability (min.) |
|---|---|---|---|---|---|
| Ex. 73 | D | 1.0 | XX | 1.0 | 15.0 |
| Ex. 74 | D | 1.0 | XXI | 1.0 | 17.0 |
| Ex. 75 | D | 1.0 | XXII | 1.0 | 12.0 |
| Ex. 76 | D | 1.0 | XXIII | 1.0 | 15.0 |
| Ex. 77 | D | 1.0 | XXIV | 1.0 | 16.5 |
| Ex. 78 | D | 1.0 | XXV | 1.0 | 18.6 |
| Ex. 79 | D | 1.0 | XXVI | 1.0 | 11.9 |
| Ex. 80 | D | 1.0 | XXVII | 1.0 | 9.7 |
| Ex. 81 | D | 1.0 | XXVIII | 1.0 | 10.5 |
| Ex. 82 | D | 1.0 | XXIX | 1.0 | 10.3 |

EXAMPLES 83-85

Compositions were melt blended containing PVC G86, 1.5 phr of LOXIOL, stabilizer C and a sodium acid salt (XXIV), (XVI) and (XVII) as described.

Disodium sebacate (XXIV) NaO(O)C—(CH$_2$)$_2$-C(O)ONa

Disodium glutarate (XVI) NaO(O)C—(CH$_2$)$_3$-C(O)ONa

Sodium glycolate (XVII) NaO(O)C—CH$_2$—OH

The results are summarized in Table 28 below.

TABLE 28

| | Stabilizer | PHR | Salt | PHR | Time to Blacken (min.) |
|---|---|---|---|---|---|
| Cont. 38 | C | 0.25 | — | | 4.5 |
| Ex. 83 | C | 0.25 | IX | 0.4 | 11 |
| Ex. 84 | C | 0.25 | XVI | 0.4 | 10.5 |
| Ex. 85 | C | 0.25 | XVII | 0.4 | 11 |

EXAMPLES 86-89

Formulations were prepared by melt blending PVC 650A which is made by Shintec and has a K value of 57, 0.45 parts of LOXIOL G-70 which is a polymeric complex ester of saturated fatty acid, 1.05 parts of LOXIOL G30 which is a simple fatty ester, 0.3 parts of calcium stearate, 3 parts of calcium carbonate, 1 part of titanium dioxide, and stabilizer F. The salts used in the compositions are (XXX), (XXXI) (XXXII) and (IX) which are described below.

Dehydroacetic acid sodium salt (XXX)
Dipotassium adipate (XXXI)
Potassium adipate (XXXII)
Disodium succinate (IX)

The results are summarized in Table 29 below.

TABLE 29

| | Stabilizer | PHR | Salt | PHR | Time to Blacken (min.) |
|---|---|---|---|---|---|
| Cont. 39 | F | 0.68 | — | | 6.2 |
| Ex. 86 | F | 0.68 | XXX | 0.5 | 8.7 |
| Ex. 87 | F | 0.68 | XXXI | 0.5 | 9.2 |
| Ex. 88 | F | 0.68 | XXXII | 0.5 | 8.2 |
| Ex. 89 | F | 0.68 | IX | 0.5 | 9.7 |

EXAMPLE 90

A formulation was prepared by melt blending PV 103EP which is made by B. F. Goodrich and has a K value of 67, 5 parts of DURASTRENGTH D-200 which is a modified acrylate impact modifier supplied by Atochem, 2 parts of XL-165 which is paraffin wax lubricants supplied by Hoechst-Celanese, 1.5 parts of calcium stearate, 1 part of METABLEN P-501, a polymethacrylate processing aid, which is supplied by Atochem, and stabilizer F. The acid salt used was acid salt (XXXIII) which was dipotassium phthalate. Results are summarized in Table 30 below.

TABLE 30

| | Stabilizer | PHR | Acid Salt | PHR | Time to Blacken (min.) |
|---|---|---|---|---|---|
| Cont. 4 | N | 0.3 | — | | 37 |
| Ex. 90 | N | 0.3 | XXXIII | 0.3 | 39.8 |

EXAMPLES 91-95

Compositions were prepared by melt blending PVC 650A which is a poly(vinyl chloride) made by Shintec having a K value of 57, 0.45 phr of LOXIOL G-70 which is a polymeric complex ester of saturated fatty acid, 1.05 parts of G-30 which is LOXIOL G-30 a simple fatty acid ester, 0.3 part of calcium stearate, 3 parts of calcium carbonate, 1 part of titanium dioxide and stabilizer E. The salts used are Disodium adipate (DSA)
Polyacrylic acid 100% Na salt (XXXIV) Molecular weight of 1,000
Dipotassium phthalate (XXXIII)
Disodium phthalate (VII)
Sodium isooctylmaleate (NaIOM)

Results are summarized in Table 31 below.

TABLE 31

| | Stabilizer | PHR | Acid Salt | PHR | Time to Blacken (min.) |
|---|---|---|---|---|---|
| Cont. 41 | F | 1.0 | — | — | 7.9 |
| Cont. 42 | F | — | DSA | 1.0 | 7.5 |
| Ex. 91 | F | 1.0 | DSA | 1.0 | 16.2 |
| Cont. 43 | F | — | XXXIV | 1.0 | 3.8 |
| Ex. 92 | F | 1.0 | XXXIV | 1.0 | 10.1 |
| Cont. 44 | F | — | XXXIII | 1.0 | 5.3 |
| Ex. 93 | F | 1.0 | XXXIII | 1.0 | 11.1 |
| Cont. 45 | F | — | VII | 1.0 | 5.1 |
| Ex. 94 | F | 1.0 | VII | 1.0 | 10.9 |
| Cont. 46 | F | — | NaIOM | 1.0 | 4.6 |
| Ex. 95 | F | 1.0 | NaIOM | 1.0 | 8.7 |

EXAMPLES 96-97

A composition was prepared based on PVC 650A which is PVC made by Shintec having a K value of 57, 0.45 phr of G-70 and 1.05 part phr of G-30 both described above, 0.3 parts of calcium stearates, 3 phr of calcium carbonate, 1 phr of titanium dioxide and disodium adipate as the acid salt. The results are summarized in Table 32 below.

TABLE 32

| | Stabilizer | PHR | Acid Salt | PHR | Stability Time (min.) |
|---|---|---|---|---|---|
| Cont. 47 | — | — | — | — | 6.1 |
| Cont. 48 | — | — | DSA | 0.5 | 6.2 |
| cont. 49 | — | — | DSA | 1.0 | 7.6 |
| Cont. 50 | P | 0.5 | — | — | 4.2 |
| Cont. 51 | P | 1.0 | | | 5.7 |
| Ex. 96 | Q | 0.5 | DSA | 0.5 | 8.4 |
| Cont. 52 | Q | 1.0 | | | 5.1 |
| Cont. 53 | Q | 2.0 | | | 8.5 |
| Ex. 97 | Q | 1.0 | DSA | 1.0 | 9.2 |

COMPARATIVE EXAMPLES 4-6

These Comparative Examples evaluated poly(vinyl chloride) homopolymer sold as GEON 103EP by B. F. Goodrich having an inherent viscosity of 1.03 measured according to ASTM D-1243-66. In Comparative 4, 100 parts of the PVC resin were stabilized with 3 parts of disodium adipate (DSA). In Comparative 5, 100 parts of PVC resin were stabilized with 3 parts of disodium maleate (DSM). In Comparative 6, 100 parts of PVC resin were stabilized with 3 parts of stabilizer R. The test samples of the materials were mixed and milled by a 2-roll mill at 325° F. (165° C.) for 4 minutes. Chips were prepared and placed in an oven at 375° F. (190° C.). Chips were removed from the oven at various intervals. Prior to aging Comparative 4 was brown, Comparative 5 was pink, and Comparative 6 was white.

Prior to testing in the oven at 375° F the disodium adipate Comparative 4 sample was brown, the Comparative 5 sample was pink, and the Comparative 6 sample was white. Little change was observed to Comparative Nos. 4 and 6 over 120 minutes. Comparative 5 darkened slightly. It was suspected the oven was not up to the set temperature. The oven aging was suspect and samples from Comparative 5 and 6 were aged in a different oven at 375° C. Comparative 4 was not repeated since it was unsatisfactory without aging. The initial color of Comparatives 5 and 6 were the same as above. Comparative 5 turned brown after 5 minutes and continued to darken until almost black at 120 minutes. Comparative 6 was white at initial testing and became exceedingly more yellow at 90 minutes, and blackened by 120 minutes.

These results showed that disodium adipate, by itself, was unsatisfactory in PVC.

EXAMPLES 98-99

Compositions were prepared based on the PVC resin used in Comparatives 4-6. The compositions contained disodium adipate, stabilizer S and XL-165 wax as indicated in Table 33 below. The compositions were mixed using a BRABENDER ® torque rheometer at 30 rpm and 200° C. The time to blacken in minutes was measured. The compositions and results are summarized in Table 33.

TABLE 33

| | Cont. 54 | Comp. 7 | Comp. 8 | Ex. 98 | Ex. 99 |
|---|---|---|---|---|---|
| PVC | 100 | 100 | 100 | 100 | 100 |
| Stabilizer | — | 0.8 | — | .8 | .8 |
| DSA | — | — | 0.4 | 0.4 | 0.4 |
| Wax | — | — | — | 0.5 | — |
| Time to Blacken (min.) | 2 | 10 | <2 | 20 | 20 |

COMPARATIVES 9-12

A study was conducted to compare different stabilizers in chlorinated poly(vinyl chloride) containing an organotin stabilizer at 0.39 parts tin per one hundred parts of resin. The compositions were mixed using a BRABENDER ® torque rheometer at 60 rpm and 200° C. with a 62 gm charge. Samples were taken for yellowness index, as well as stability in minutes, as measured by the time to darken. The compositions and results are reported in Table 34 below in parts per hundred resin (phr).

TABLE 34

| | Cont. 55 | Comp. 9 | Comp. 10 | Comp. 11 | Comp. 12 |
|---|---|---|---|---|---|
| CPVC powder | 100 | 100 | 100 | 100 | 100 |
| DSP[1] | | 0.90 | | 1.8 | |
| DSA[2] | | | 0.45 | | 0.9 |
| BRABENDER Stability[3] (min.) | 17.5 | 27.0 | 13.0 | 25.0 | 14.5 |
| Yellowness Index min. | | | | | |
| 2 | 25 | 25 | 26 | 27 | 27 |
| 4 | 27 | 27 | 29 | 28 | 31 |
| 6 | 30 | 29 | 31 | 29 | 34 |
| 8 | 31 | 30 | 34 | 32 | 36 |
| 10 | 33 | 31 | 36 | 31 | 38 |
| 12 | 34 | 35 | 40 | 34 | 38 |
| 16 | 47 | 44 | black | 36 | 47 |
| 20 | black | 64 | | 40 | black |
| 22 | | black | | 43 | |

[1]Disodium hydrogen phosphate DSP
[2]DSA made by Atochem. N. A.
[3]Curves and chips were taken by a BRABENDER ® torque rheometer at 60 rpm and 200° C. and 62 gm charge The results show DSP had better stabilization properties when used with organotin than DSA which actually shortens stability time in CPVC.

The controlled composition containing chlorinated poly(vinyl chloride) stabilized with tin alone, had a BRABENDER ® stability of 17.5 minutes and a yellowness index of 22. The use of disodium phosphate, Comparatives 9 and 11, increased the BRABENDER ® stability time as well as the time to blacken. Comparatives 9 and 12 show that disodium adipate is not as effective in chlorinated poly(vinyl chloride) as disodium phosphate. This suggests that differences in the polymer can affect the differences in the stability of a stabilized polymer composition.

While exemplary embodiments of the invention have been described, the true scope of the invention is to be determined from the following claims.

What is claimed is:

1. A stabilized polymer composition comprising:
    a rigid polymeric material comprising greater than 60 percent by volume of poly(vinyl chloride);
    a metal based stabilizer; and
    disodium adipate.

2. The composition as recited in claim 1 wherein the disodium adipate is present in an amount to produce a synergistic thermal stabilizing effect with the metal based stabilizer.

3. The composition as recited in claim 1 wherein there is from about 0.01 to 10 percent by weight based on the poly(vinyl chloride) of the disodium adipate.

4. The composition as recited in claim 3 wherein there is from about 0.1 to 5.0 percent by weight based on the poly(vinyl chloride) of the disodium adipate.

5. The composition as recited in claim 4 wherein there is from about 0.1 to about 2.0 percent by weight based on the poly(vinyl chloride) of the disodium adipate.

6. The composition as recited in claim 1 wherein there is from about 0.1 to about 2.0 percent by weight based on the poly(vinyl chloride) of the metal based stabilizer.

7. The composition as recited in claim 1 wherein the metal based stabilizer is tin based.

8. The composition as recited in claim 7 wherein the metal based stabilizer is selected from the group consisting of alkyltin mercaptide, alkyltin mercapto ester, and alkyltin sulfur bridge tin compounds.

9. The composition as recited in claim 1 wherein the metal based stabilizer is selected from the group consisting of organometallic, metallo-organic, lead carbonate, lead sulfate, lead oxide, lead phosphate, and lead silicate.

10. The composition as recited in claim 1 wherein the polymeric material is 100 percent poly(vinyl chloride).

11. The composition as recited in claim 1 wherein the poly(vinyl chloride) is a homopolymer.

12. A stabilized polymer composition consisting essentially of:
    a rigid polymer material comprising greater than 60 percent by weight of poly(vinyl chloride);
    a tin based stabilizer; and
    disodium adipate present in an amount to produce a synergistic thermal stabilizing effect with the tin based stabilizer.

13. The composition as recited in claim 12 wherein there is from about 0.01 to about 10 percent by weight based on the poly(vinyl chloride) of the disodium adipate.

14. The composition as recited in claim 13 wherein there is from about 0.1 to about 5.0 percent by weight based on the poly(vinyl chloride) of the disodium adipate.

15. The composition as recited in claim 14 wherein there is from about 0.1 to about 2.0 percent by weight based on the poly(vinyl chloride) of the disodium adipate.

16. The composition as recited in claim 12 wherein there is about 0.01 to about 5.0 percent by weight based on the poly(vinyl chloride) of the tin based stabilizer.

17. The composition as recited in claim 12 wherein the tin based stabilizer is selected from the group consisting of alkyltin mercaptide, alkyltin mercapto ester, and alkyltin sulfur bridged tin compounds.

18. The composition as recited in claim 12 wherein the polymeric material is 100 percent poly(vinyl chloride).

19. The composition as recited in claim 12 wherein the poly(vinyl chloride) is a homopolymer.

20. A process for forming a shaped structure comprising:
    heating a mixture comprising:
    a rigid polymeric material comprising greater than 60 percent by volume of poly(vinyl chloride),
    a metal based stabilizer, and
    disodium adipate, and
    forming the mixture into a shaped structure.

21. The process as recited in claim 20 wherein the process is continuous.

22. The process as recited in claim 21 wherein the disodium adipate is present in an amount to produce a synergistic thermal stabilizing effect with the metal based stabilizer.

23. The process as recited in claim 22 wherein the metal based stabilizier is tin based.

24. The process as recited in claim 23 wherein the tin based stabilizer is selected from the group consisting of alkyltin mercaptide, alkyltin mercapto ester, and alkyltin sulfur bridged tin compounds.

25. The process as recited in claim 21 wherein the formed structure is vinyl house siding.

26. The process as recited in claim 21 wherein the formed structure is pipe.

27. The process as recited in claim 20 wherein the shaped article is formed by injection molding.

28. A composition consisting essentially of:
a polymeric material comprising greater than 60 percent by volume of a halogen containing polymer;
a tin based stabilizer;
disodium adipate; and
a nonchlorinated plasticizer.

* * * * *